US011887741B2

United States Patent
Ingraham et al.

(10) Patent No.: US 11,887,741 B2
(45) Date of Patent: *Jan. 30, 2024

(54) FUEL ASSEMBLY WITH OUTER CHANNEL INCLUDING REINFORCED SIDEWALL AND NON-REINFORCED SIDEWALL

(71) Applicant: Global Nuclear Fuel—Americas, LLC, Wilmington, NC (US)

(72) Inventors: Jason B Ingraham, Wilmington, NC (US); Gerald D. Kvaall, Jr., Wilmington, NC (US); Paul E. Cantonwine, Wilmington, NC (US); Michael W. Thomas, Wilmington, NC (US); William C. Cline, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,680

(22) Filed: Jan. 18, 2022

(65) Prior Publication Data

US 2022/0139575 A1    May 5, 2022

Related U.S. Application Data

(62) Division of application No. 16/850,128, filed on Apr. 16, 2020, now Pat. No. 11,244,768, which is a
(Continued)

(51) Int. Cl.
*G21C 3/322* (2006.01)
*G21C 3/324* (2006.01)
(Continued)

(52) U.S. Cl.
CPC ............ *G21C 3/322* (2013.01); *G21C 3/324* (2013.01); *G21C 1/084* (2013.01); *G21C 3/04* (2013.01);
(Continued)

(58) Field of Classification Search
CPC ........... G21C 3/322; G21C 3/324; G21C 3/04
(Continued)

(56) References Cited

U.S. PATENT DOCUMENTS 4,285,769 A    8/1981    Specker et al.
4,591,479 A    5/1986    Weitzberg
(Continued)

FOREIGN PATENT DOCUMENTS

DE    69209415 T2    9/1996
DE    69309305 T2    10/1997
(Continued)

OTHER PUBLICATIONS

European Search Report issued in European Application No. 11174117.9, dated Jun. 2, 2014.
(Continued)

*Primary Examiner* — Jack W Keith
*Assistant Examiner* — Daniel Wasil
(74) *Attorney, Agent, or Firm* — Harness, Dickey & Pierce, P.L.C.

(57) ABSTRACT

The fuel assembly includes at least one fuel rod and an outer channel with four sidewalls surrounding the fuel rod, the outer channel having a configuration based on a position of the fuel assembly within a core of the nuclear reactor, wherein at least a first select sidewall, of the four sidewalls of the outer channel, is a reinforced sidewall, the remaining sidewalls of the outer channel, other than the at least a first select sidewall, are non-reinforced sidewalls, the at least a first select sidewall being in a controlled location that faces and is directly adjacent to a control blade that is to be utilized in the nuclear reactor, wherein an entirety of the reinforced sidewall as a whole is at least one of thicker and made from
(Continued)

a material that is more resistant to radiation-induced deformation as compared to an entirety of the non-reinforced sidewalls.

11 Claims, 4 Drawing Sheets

Related U.S. Application Data division of application No. 15/069,302, filed on Mar. 14, 2016, now Pat. No. 10,658,086, which is a division of application No. 12/843,037, filed on Jul. 25, 2010, now Pat. No. 9,287,012.

(51) Int. Cl.
| | |
|---|---|
| G21C 3/06 | (2006.01) |
| G21C 3/04 | (2006.01) |
| G21C 1/08 | (2006.01) |
| G21C 21/02 | (2006.01) |
| G21C 15/02 | (2006.01) |

(52) U.S. Cl.
CPC ............... *G21C 3/06* (2013.01); *G21C 15/02* (2013.01); *G21C 21/02* (2013.01); *Y02E 30/30* (2013.01)

(58) Field of Classification Search
USPC ........................................ 376/443, 444, 446
See application file for complete search history.

(56) References Cited

U.S. PATENT DOCUMENTS

| | | | |
|---|---|---|---|
| 4,629,599 A | 12/1986 | Crowther et al. | |
| 4,687,629 A | 8/1987 | Mildrum | |
| 4,751,044 A | 6/1988 | Hwang et al. | |
| 4,775,508 A | 10/1988 | Sabol et al. | |
| 4,970,047 A | 11/1990 | Ueda et al. | |
| 5,009,840 A | 4/1991 | Ueda et al. | |
| 5,017,332 A | 5/1991 | Dix et al. | |
| 5,068,082 A | 11/1991 | Ueda et al. | |
| RE33,818 E | 2/1992 | Crowther, Jr. et al. | |
| 5,112,570 A | 5/1992 | Dix et al. | |
| 5,116,567 A | 5/1992 | Fennern | |
| 5,139,735 A | 8/1992 | Dillmann | |
| 5,149,491 A | 9/1992 | Congdon et al. | |
| 5,149,495 A | 9/1992 | Elkins | |
| 5,162,097 A | 11/1992 | Fennern | |
| 5,185,120 A | 2/1993 | Fennern | |
| 5,204,053 A | 4/1993 | Fennern | |
| RE34,246 E | 5/1993 | Crowther et al. | |
| 5,225,154 A | 7/1993 | Kanno et al. | |
| 5,253,278 A | 10/1993 | Kanazawa et al. | |
| 5,265,139 A | 11/1993 | Yanagi et al. | |
| 5,267,286 A | 11/1993 | Hirukawa | |
| 5,267,291 A | 11/1993 | Matzner et al. | |
| 5,297,177 A | 3/1994 | Inagaki et al. | |
| 5,406,597 A | 4/1995 | Fennern et al. | |
| 5,410,580 A | 4/1995 | Seino | |
| 5,471,513 A | 11/1995 | Ose | |
| 5,519,746 A | 5/1996 | Dalke et al. | |
| 5,524,032 A | 6/1996 | Adamson et al. | |
| 5,555,281 A | 9/1996 | Williamson et al. | |
| 5,627,865 A | 5/1997 | Williamson et al. | |
| 5,677,938 A | 10/1997 | Gassmann | |
| 5,712,888 A | 1/1998 | Adamson et al. | |
| 5,805,656 A | 9/1998 | Adamson | |
| 6,205,196 B1 | 3/2001 | Yamashita et al. | |
| 6,259,756 B1 | 7/2001 | Reese et al. | |
| 6,510,192 B1 | 1/2003 | Yamashita et al. | |
| 6,516,043 B1 | 2/2003 | Chaki et al. | |
| 6,925,138 B2 | 8/2005 | Nakamaru et al. | |
| 7,480,599 B2 | 1/2009 | Russell, II | |
| 8,257,518 B2 * | 9/2012 | Dahlback | C22F 1/186 |
| | | | 148/672 |
| 9,287,012 B2 | 3/2016 | Ingraham et al. | |
| 2007/0153963 A1 | 7/2007 | Lutz et al. | |
| 2008/0095296 A1 | 4/2008 | DeFilippis | |
| 2008/0137792 A1 | 6/2008 | Kropaczek et al. | |
| 2009/0196391 A1 | 8/2009 | Miwa et al. | |
| 2009/0285350 A1 | 11/2009 | Cantonwine et al. | |

FOREIGN PATENT DOCUMENTS

| | | |
|---|---|---|
| DE | 69602123 T2 | 11/1999 |
| EP | 0795618 A1 | 9/1997 |
| EP | 1804253 A3 | 12/2011 |
| JP | H01239496 A | 9/1989 |
| JP | 2004-069362 A | 3/2004 |
| JP | 2004069362 A * | 3/2004 |

OTHER PUBLICATIONS

English translation of Swedish Office Action dated Jun. 7, 2010 issued in corresponding Swedish Application No. 0950337-6.
Griffths, et al., Microstructural Aspects of Accelerated Deformation of Zircaloy Nuclear Reactor Components During Service, *Journal of Nuclear Materials*, 225, (1995), pp. 245-258.
Ankhtar, et al., "Performance Monitoring of Zircaloy-4 Square Fuel Channels at Taps 1 & 2/NPCIL," *Proc. National Seminar on Non-Destructive Evaluation*, Dec. 7-9, 2006.
German Office Action dated Aug. 9, 2021, issued in corresponding German Patent Application No. 10 2009 025 838.8.
Notice of Allowance dated Sep. 30, 2021, issued in corresponding U.S. Appl. No. 16/850,128.

* cited by examiner

FUEL ASSEMBLY WITH OUTER CHANNEL INCLUDING REINFORCED SIDEWALL AND NON-REINFORCED SIDEWALL

CROSS REFERENCE TO RELATED APPLICATIONS

This application is a divisional of U.S. patent application Ser. No. 16/850,128, filed Apr. 16, 2020, which is a divisional of U.S. patent application Ser. No. 15/069,302, filed Mar. 14, 2016, which is a divisional of U.S. patent application Ser. No. 12/843,037, filed Jul. 25, 2010, the contents of each of which are incorporated by reference in its entirety.

BACKGROUND

As shown in FIG. 1, a conventional fuel assembly 10 of a nuclear reactor, such as a Boiling Water Reactor (BWR), may include an outer channel 12 surrounding an upper tie plate 14 and a lower tie plate 16. A plurality of full length fuel rods 18 and/or part length fuel rods 19 may be arranged in a matrix within the fuel assembly 10 and pass through a plurality of spacers (also known as spacer grids) 15 axially spaced one from the other and maintaining the rods 18, 19 in the given matrix thereof. The fuel rods 18 and 19 are generally continuous from their base to terminal, which, in the case of the full length fuel rod 18, is from the lower tie plate 16 to the upper tie plate 14. Outer channel 12 encloses the fuel rods 18/19 within the assembly 10 and maintains water or other coolant flow within assembly 10 about fuel rods 18/19 and in contact with the fuel rods 18/19 to facilitate heat transfer from the fuel to the coolant. Outer channel 12 is traditionally uniform in mechanical design and material for each other assembly 10 provided to a particular core, to aid in assembly design standardization and manufacturing simplicity. Outer channel 12 may be fabricated conventionally of a material compatible with the operating nuclear reactor environment, such as a Zircaloy-2.

As shown in FIG. 2, a conventional reactor core, such as a BWR core, may include a plurality of cells 40 in the reactor core. Each cell may include four fuel assemblies 10 having adjacent fuel channels 12. Other fuel assemblies 10 may be placed in the reactor core outside of cells 40 and not adjacent to control blades. The fuel assemblies 10 in FIG. 2 are shown in section to illustrate control blades 45, which are conventionally cruciform-shaped and movably-positioned between the adjacent surfaces of the fuel channels 12 in a cell 40 for purposes of controlling the reaction rate of the reactor core. Conventionally, there is one control blade 45 per cell 40. As a result, each fuel channel 12 has two sides adjacent to the control blade 45 and two sides with no adjacent control blade.

The control blade 45 is formed of materials that are capable of absorbing neutrons without undergoing fission itself, for example, boron, hafnium, silver, indium, cadmium, or other elements having a sufficiently high capture cross section for neutrons. Thus, when the control blade 45 is moved between the adjacent surfaces of the fuel channels 12, the control blade 45 absorbs neutrons which would otherwise contribute to the fission reaction in the core. On the other hand, when the control blade 45 is moved out of the way, more neutrons will be allowed to contribute to the fission reaction in the core. Conventionally, only a fraction of all control blades 45 within a core will be exercised to control the fission reaction within the core during an operating cycle. As such, only a corresponding fraction of fuel assemblies will be directly adjacent to an extended control blade, or "subject to control," during an operating cycle.

After a period of time, a fuel channel 12 may become distorted as a result of differential irradiation growth, differential hydrogen absorption, and/or irradiation creep. Differential irradiation growth is caused by fluence gradients and results in fluence-gradient bow. Differential hydrogen absorption is a function of differential corrosion resulting from shadow corrosion on the channel sides adjacent to the control blades 45 and the percent of hydrogen liberated from the corrosion process that is absorbed into the fuel channel 12; this results in shadow corrosion-induced bow. Irradiation creep is caused by a pressure drop across the channel faces, which results in permanent distortion called creep bulge. As a result, the distortion (bow and bulge) of the fuel channel 12 may interfere with the movement of the control blade 45. Channel/control blade interference may cause uncertainty in control blade location, increased loads on reactor structural components, and decreased scram velocities. Conventionally, if channel/control blade interference has become severe, the control blade is declared inoperable and remains fully inserted.

SUMMARY

Example embodiments are directed to fuel assemblies useable in nuclear reactors and methods of optimizing and fabricating the same. Example embodiment fuel assemblies include an outer channel having a physical configuration determined based on a position of the fuel assembly within a core of the nuclear reactor, such as the position of the fuel assembly with respect to a control blade in the nuclear reactor that will be used to control core reactivity. When example embodiment fuel assemblies are to be directly adjacent to an inserted control blade, the outer channel may be thickened, reinforced, and/or fabricated of a material more resistant to deformation than Zircaloy-2, such as Zircaloy-4, NSF, and VB, so as to reduce or prevent distortion of the channel against the control blade and interfering with operation of the same. When example embodiment fuel assemblies are not in a controlled location, the outer channel may be thinned so as to increase water volume and reactivity in the assembly. As such, a reactor core including example embodiment fuel assemblies will include fuel assemblies having unique outer channels, in thickness, material, etc., unlike conventional power reactor cores.

Example methods of configuring fuel assemblies include determining operational characteristics of the fuel assembly, such as the likelihood that the fuel assembly is controlled via control blade insertion in the nuclear reactor in a current or future fuel cycle, and physically selecting or modifying the outer channel of the fuel assembly based thereon. For example, if the fuel assembly is in a controlled location during the fuel cycle, the outer channel may be fabricated of a material more resistant to deformation than Zircaloy-2, such as Zircaloy-4, NSF, or VB, and/or thickened. Or, for example, if the fuel assembly is not in a controlled location, the outer channel may be approximately 20 mils (thousandths of an inch) or more thinner than outer channels of conventional fuel assemblies. Example methods are useable with or may further include configuring outer channel characteristics in order to meet desired neutronic properties of the fuel assembly.

DETAILED DESCRIPTION

Hereinafter, example embodiments will be described in detail with reference to the attached drawings. However, specific structural and functional details disclosed herein are merely representative for purposes of describing example embodiments. The example embodiments may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

As used herein, the singular forms "a," "an," and "the" are intended to include the plural forms as well, unless the language explicitly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 1:
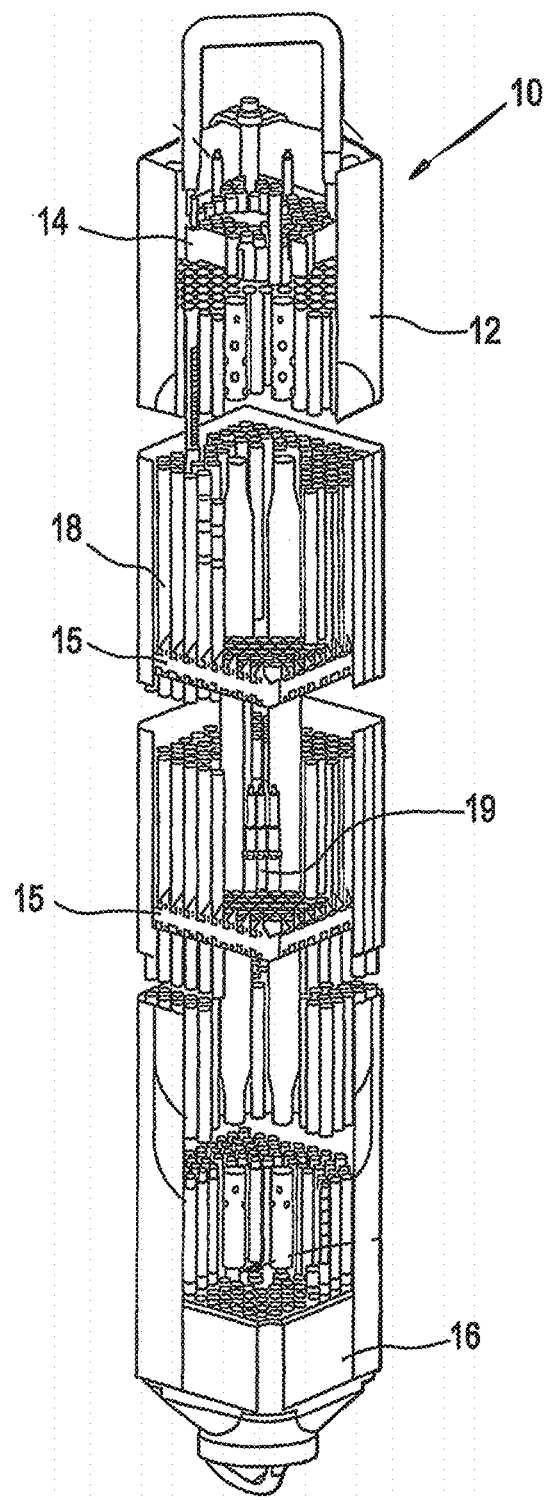
FIG. 1 is an illustration of a conventional fuel assembly having an outer channel.
Figure 2:
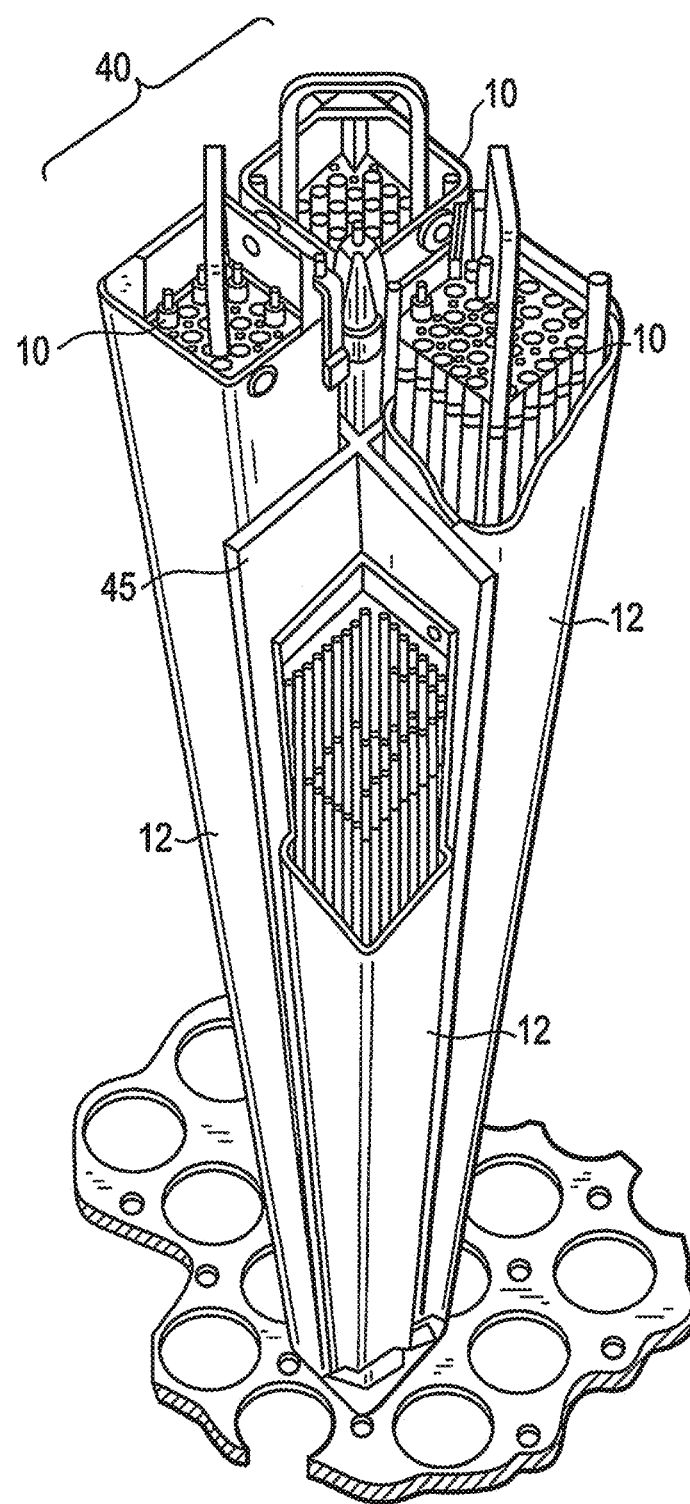
FIG. 2 is an illustration of a conventional cell grouping in a reactor core with a cruciform control blade.

As used herein, "channel," "outer channel," and the like are defined in accordance with the conventional fuel assembly structures shown and described in FIG. 1 as element 12, subject to the modifications discussed hereafter. As used herein, "distortion" or "channel distortion" includes both channel bow and channel bulge in nuclear fuel assemblies that may cause interference with control blade operation.

It should also be noted that in some alternative implementations, the functions/acts noted may occur out of the order noted in the figures or described in the specification. For example, two figures or steps shown in succession may in fact be executed in parallel and concurrently or may sometimes be executed in the reverse order or repetitively, depending upon the functionality/acts involved.

The inventors of the present application have identified several potential fuel channel characteristics and/or modifications to reduce or prevent fuel channel distortion. The inventors of the present application have further identified the effect these characteristics, in combination with other fuel assembly parameters, have on whole core performance. Example embodiments and methods discussed below uniquely address these previously-unidentified effects to achieve several advantages, including improved core performance, increased energy generation, reduced control blade error, materials conservation, and/or other advantages discussed below or not, in commercial nuclear power plants, while departing from total fuel channel uniformity purposefully used in conventional commercial nuclear power plants.

Example Embodiments

Example embodiment fuel assemblies include fuel channels with optimized physical properties. Example embodiment fuel assemblies may include one or more channel characteristics to decrease fuel channel distortion. For example, the fuel channel may be thickened in its shortest dimension or reinforced with additional material. The thicker or reinforced fuel channel has greater resistance to distortion from differential irradiation growth, differential hydrogen absorption, and/or irradiation creep experienced in operating nuclear reactor environments. The percent reduction in deformation is approximately proportional the percentage increase in channel thickness.

Or, for example, materials may be used in the channel that are resistant to distortion. For example, Zircaloy-4, a known zirconium alloy excluding nickel, may replace Zircaloy-2, which contains nickel. The reduced nickel content in Zircaloy-4 reduces differential hydrogen absorption and resultant channel bow. Other materials more resistant to deformation than Zircaloy-2 may additionally be used in whole or in part in addition to Zircaloy-4. For example, additional materials more resistant to deformation than Zircaloy-2 are described in co-pending application Ser. No. 12/153,415 "Multi-layer Fuel Channel and Method of Fabricating the Same," incorporated herein by reference in its entirety. That document discloses alloys hereinafter called "NSF" having about 0.6-1.4% niobium (Nb), about 0.2-0.5% iron (Fe), and about 0.5-1.0% tin (Sn), with the balance being essentially zirconium (Zr) and alloys hereinafter called "VB" having about 0.4-0.6% tin (Sn), about 0.4-0.6% Fe, and about 0.8-1.2% chromium (Cr), with the balance being essentially zirconium (Zr).

Other configurations for decreasing fuel channel distortion are useable with example embodiment fuel assemblies. Example embodiment fuel assemblies may use multiple mechanisms in combination to further reduce fuel channel distortion. Configurations and fuel channel characteristics in example embodiment fuel channels may be selected in accordance with example methods, discussed in the following section.

Example embodiment fuel assemblies may further include channel characteristics that improve fuel neutronic characteristics, decrease material usage and costs, and/or improve other fuel assembly parameters. Such characteristics may include, for example, a thinner channel that permits greater water volume and neutron moderation within example embodiment fuel assemblies. The thinner channel may consume less material in fabrication and improve fuel assembly reactivity, heat transfer characteristics, etc.

Example embodiment fuel assemblies having thicker, reinforced, and/or thinner channels, different alloys, or other channel modification may be used instead of conventional fuel assemblies having standardized channels throughout an entire core. Example embodiment fuel assemblies may thus significantly improve performance of a core including example embodiment fuel assemblies and/or reduce fuel resource consumption. For example, thinning the channels of 75% of the fresh conventional fuel assemblies for a particular fuel cycle by approximately 20 mils (20 thousandths of an inch) in the thinnest dimension may result in a reduction in volume of approximately 16,500 in$^3$ zirconium alloy used. In the same example, assuming 8 channels would not need to be replaced because they include channel mechanisms to decrease fuel channel deformation, an additional ~2,000 in$^3$ zirconium alloy volume may be saved. In the same example, assuming 8 channels are not needed to be fabricated because 8 fewer fuel assemblies are required in a fuel cycle with fuel savings from channel characteristics that improve fuel neutronic characteristics of example embodiment fuel assemblies, an additional ~2,000 in$^3$ zirconium alloy volume may be conserved. Thus, example embodiment fuel assemblies, having different channel characteristics selected and implemented in accordance with example methods discussed below, may result in significant materials savings and improved core performance.

Example Methods

As discussed above, increasing channel thickness decreases water volume and overall reactivity of an assembly having a thicker channel. Lower reactivity results in less optimal fuel usage and less power production in a nuclear core of a nuclear power reactor. Increasing channel thickness further increases costs of fuel assemblies having thicker channels. Increasing channel thickness also reduces the risk and/or magnitude of channel distortion and interference with control blade function. Decreasing channel thickness has a generally opposite effect of increasing water volume and overall reactivity of an assembly having a thinner channel, while also increasing distortion likelihood. Zircaloy-4 has similar fluence bow and creep bulge characteristics compared to Zircaloy-2. Zircaloy-4, however, resists channel bow caused by differential hydrogen absorption. NSF and VB are additionally resistant to other forms of bow and bulge causing channel deformation.

Figure 3:
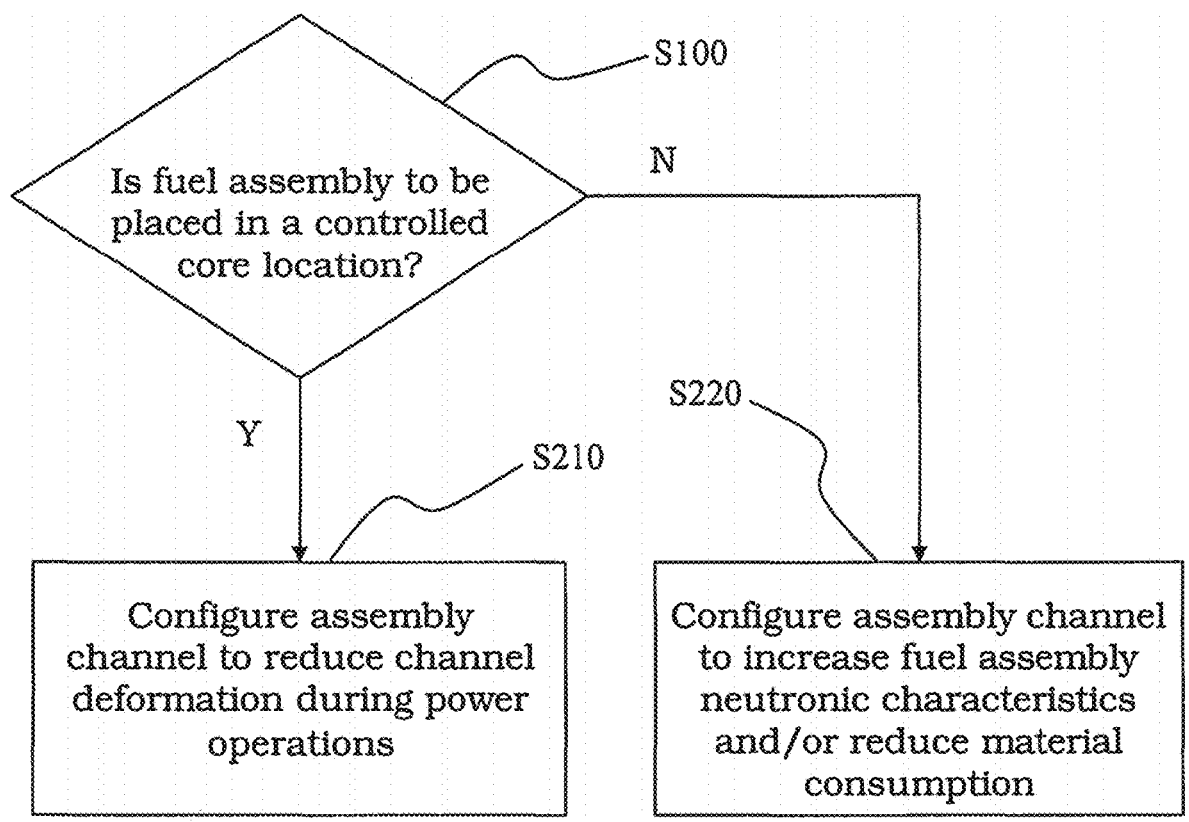
FIG. 3 is a flow chart of an example method of optimizing fuel channels in fuel assemblies.

Example methods uniquely leverage the above advantages and disadvantages of fuel channel modification to reduce or prevent channel distortion while minimizing negative effects on fuel economy, control blade function, and other core performance metrics. As shown in FIG. 3, example methods include an operation S100 of determining fuel assembly characteristics, including whether a fuel assembly is placed or will be located in a cell such that the fuel assembly will be directly adjacent to a control blade that will be operated in a current and/or future fuel cycle to control the fission reaction in the core. A fuel assembly positioned directly adjacent to a control blade that is likely to be exercised to control the fission reaction is herein defined as a "controlled fuel assembly" or in a "controlled location," because it is most subject to control blade negative reactivity and most likely to affect control blade performance. The determination of whether a fuel assembly is subject to control may be based on one or more fuel assembly operational characteristics that determines placement/position of the fuel assembly within the reactor core over one or more fuel cycles, in addition to overall plant characteristics such as core size, thermal power rating, etc.

For example, an operational characteristic may be reactivity of the fuel assembly. Reactivity determines the degree to which the fuel can contribute to the fission chain reaction during power operations. Reactivity is directly controllable with control blade insertion, due to the blades' neutron-absorbing properties. As such, fuel with higher reactivity may be placed in controlled locations to enhance core-wide overall control of the neutron chain reaction. Similarly, fuel with lower reactivity may be less likely to be subject to control.

Although location with regard to utilized cruciform control blades is described in connection with example embodiments and methods, it is understood that other sources of negative reactivity may additionally be accounted for in example methods and embodiments. For example, proximity to burnable poisons or proximity to a control rod present in some plant designs may be accounted for by determining operational characteristics of the fuel assembly that determine the likelihood that the fuel assembly will be placed in that proximity.

Controlled locations may also be determined in S100 by known core modeling and mapping methods and software. For example, a program may receive input of several fuel assembly operational characteristics for several fuel assemblies and determine an optimum core configuration with corresponding fuel assembly positions. Because example methods and embodiments may themselves affect fuel assembly operational characteristics as discussed below, such known core modeling and mapping methods may be alternatively and repetitively executed before and following fuel assembly modification in example methods to ensure optimized core performance.

Following the determination in S100, one or more fuel assembly channels are configured based on the position determination. The configuring generally increases assembly reactivity, decreases distortion potential, and/or reduces material consumption in the configured assembly/assemblies.

If it is determined from S100 that the assembly will be placed in a cell adjacent to an employed control blade, i.e., subject to control, then a first configuration S210 is pursued. S210 configures the assembly channel to reduce or eliminate channel distortion during power operations. For example, in S210, channel thickness may be increased by several hundredths of an inch or more to ensure decreased channel distortion. The degree of thickening may further be based on decreased reactivity or other operational characteristics desired of the assembly during operation in the nuclear reactor core. Or, channel thickness may be increased or the channel may be reinforced on only a side or wall directly adjacent to the control blade that will be operated, while remaining fuel channel sides may be unmodified or modified in accordance with S220.

Additionally, or in the alternative, in S210, the channel may be fabricated out of a material more resistant to distortion than Zircaloy-2, including shadow-corrosion-bow-resistant Zircaloy-4, or fluence-gradient-bow and/or creep-bulge-resistant NSF or VB. In this way, only assemblies determined to be at a position benefitting from a thicker or reinforced channel or a channel including Zircaloy-4, NSF, and/or VB, such as a controlled assembly likely to be placed in a cell adjacent to an employed control blade, are configured with channel features that decrease or eliminate distortion while leveraging other characteristics such as reactivity or fabrication expense. Further, because assemblies in a controlled core position typically possess higher excess reactivity, a thicker or reinforced channel that may decrease reactivity is not a significant disadvantage for the overall core reactivity; indeed, such reactivity-decreasing configuration may aid in balancing core power production and/or simplifying control blade operations.

If it is determined from S100 that the assembly will be placed in an uncontrolled core position, such as an edge position in the core or adjacent to a control blade that will not be utilized, then a second configuration S220 is pursued. S220 configures the assembly channel to increase fuel assembly neutronic characteristics for the assembly in the operating core and decrease manufacturing burden in fabricating the assembly, without regard to distortion risk. For example, in S220, channel thickness may be decreased by several hundredths of an inch or more to increase water or moderator volume in the assembly, thereby increasing reactivity and fuel usage in the assembly. Reducing channel thickness in S220 further decreases an amount of expensive zirconium alloy or other channel material required to fabricate the assembly. In S220, assembly channel thickness may be reduced by a margin that takes into account the increased reactivity; the channel may be thinned such that the assembly has a determined or desired reactivity or other operational property when in use in the nuclear reactor core. In this way, a core may contain fuel assemblies with several different, unique channel thicknesses and other characteristics as determined in S210 and S220.

Assemblies may be configured in S210 and S220 in several different manners and timeframes. For example, the configuring in S210 and S220 may be selecting a preexisting assembly or ordering an assembly having the configuration determined in S210 and S220, by a power plant operator, for insertion or re-insertion during an upcoming fuel cycle in the nuclear reactor core. Alternatively, the configuring in S210 and S220 may be a physical fabricating or modifying of the fuel assembly to match the configuration determined in S210 and S220 by a fuel assembly manufacturer or refitter, for example.

Example methods including S100 and S210/S220 may address fuel assembly location and configuration for use in an immediately approaching fuel cycle, a future fuel cycle, and/or multiple fuel cycles. For example, S100 may determine that a fuel assembly will be in a controlled position adjacent to an employed control blade in a first fuel cycle, and the same or later analysis may determine that the fuel assembly will be relocated to a position away from a control blade in a second layer fuel cycle. The assembly may be configured under S210 for the first cycle, and then reconfigured under S220 for the second cycle. Such reconfiguring may include re-channeling the fuel assembly by removing and replacing the channel used in the first fuel cycle with a channel having the configuration determined in S220 for use in the second fuel cycle. Similarly, a reverse determination may result in the reverse configuration. Or, for example, S100 may determine, based on multi-cycle operating parameters, that a particular fuel assembly will not be placed in a controlled location in its lifetime. Configuration of the assembly may then proceed under S220, without further modification of the assembly during its lifetime in the reactor.

Figure 4:
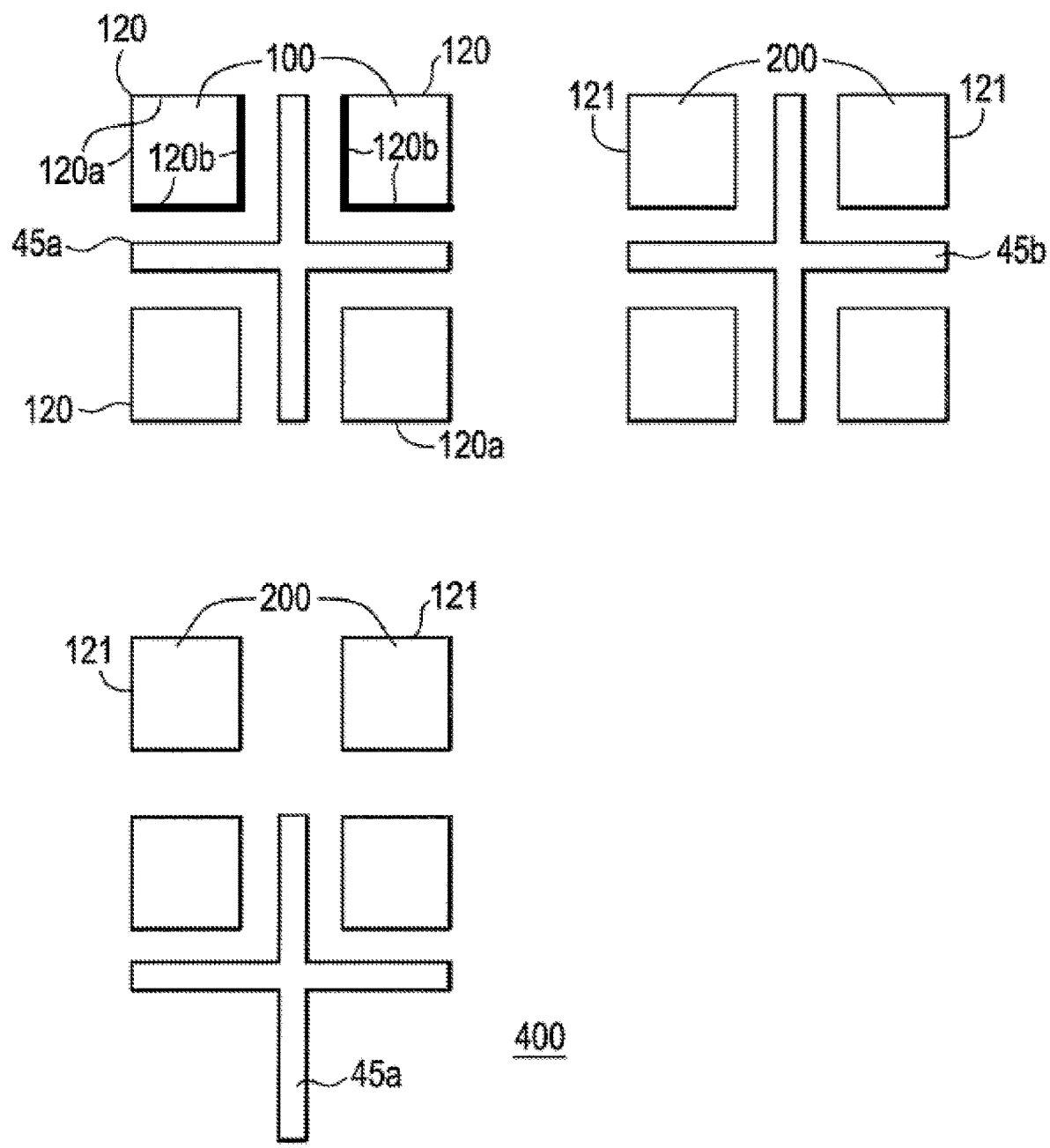
FIG. 4 is a schematic illustration of a core section containing example embodiment fuel bundles optimized in accordance with example methods.

FIG. 4 is an illustration of an example reactor core 400 containing example embodiment fuel assemblies 100 and 200 modified in accordance with example methods. As shown in FIG. 4, four example embodiment assemblies 100 are in controlled locations about a control blade 45a that is anticipated to be used to control the fission chain reaction in the core. According to example methods, assemblies 100 about blade 45a have channels 120 configured in accordance with S210. For example, channels 120 may be thickened, reinforced, and/or fabricated of a material more resistant to deformation than Zircaloy-2. Or, for example, only select sides or walls 120b directly adjacent to control blade 45a may be configured in accordance with S210, including being thickened, reinforced, and/or fabricated of a material more resistant to deformation than Zircaloy-2. Other walls 120a may be unmodified or thinned and/or fabricated of a material equally or less resistant to deformation than Zircaloy-2, in accordance with S220.

Example assemblies 200, adjacent to blade 45b that is not to be operated during the fuel cycle or adjacent to no control blade, may be configured in accordance with S220. For example, channels 121 in assemblies 200 may be thinned and/or fabricated of a material equally or less resistant to deformation than Zircaloy-2.

Example methods including S100 and S210/S220 may be executed for each assembly to be placed within a core. Alternatively, example methods may be executed only with respect to particular assemblies in order to optimize core operating characteristics. For example, if example fuel assembly channel configuring methods are used in conjunction with other known core configuration methods, the calculated or desired fuel assembly locations and characteristics may require no fuel assembly channel configuring or reconfiguring as in S210 or S220.

Example methods may be used as an integral part of core design or as a separate step performed alternatively and/or iteratively with other known methods of core design. For example, a known core design program may output a core map using fuel assembly characteristics with fuel having uniform channel properties. Example methods including S100 and S210/S220 may then be performed on some or all fuel assemblies involved in the map, changing their operational characteristics. The core design program may then be re-executed with the modified fuel assembly characteristics, and this alternating core configuring between example and known methods may continue until no further optimization is possible or desired. Or, example methods may be used as an integral part of otherwise known core design methods, treating reactivity, bow likelihood, and other fuel assembly parameters affected by channel configuring in S210 and S220 as additional variables in the core design process.

Example embodiments and methods thus being described, it will be appreciated by one skilled in the art that example embodiments may be varied through routine experimentation and without further inventive activity. Variations are not to be regarded as departure from the spirit and scope of the example embodiments, and all such modifications as would be obvious to one skilled in the art are intended to be included within the scope of the following claims.

What is claimed is:

1. A fuel assembly for use in a nuclear reactor, the fuel assembly comprising:
   at least one fuel rod; and
   an outer channel with four sidewalls surrounding the fuel rod, the outer channel having a configuration based on a position of the fuel assembly within a core of the nuclear reactor,
   at least one first select sidewall, of the four sidewalls of the outer channel, being a reinforced sidewall, at least one second sidewall, of the four sidewalls, being a non-reinforced sidewall, the reinforced sidewall being configured to be in a controlled location that faces and is directly adjacent to a control blade that is to be utilized in the nuclear reactor,
   an entirety of the reinforced sidewall as a whole being at least one of a first uniformly constant thickness that is thicker than a second uniformly constant thickness of an entirety of the non-reinforced sidewall as a whole or uniformly made from a material that is more resistant to radiation-induced deformation as compared to an entirety of the non-reinforced sidewall.

2. The fuel assembly of claim 1, wherein the at least one first select sidewall includes two select sidewalls of the fuel assembly that are in a controlled location such that the two select sidewalls face and are directly adjacent to a control blade that is to be utilized in a reactor core of the nuclear reactor, the two select sidewalls being the reinforced sidewall that are adjacent to each other on the fuel assembly.

3. The fuel assembly of claim 2, wherein the non-reinforced sidewall does not face a control blade that is to be utilized in the nuclear reactor.

4. The fuel assembly of claim 1, wherein,
the non-reinforced sidewall is made from a zirconium alloy that is equal to or less resistant to radiation-induced deformation than Zircaloy-2, and
the reinforced sidewall is made from a zirconium alloy that is more resistant to radiation-induced deformation than Zircaloy-2, the reinforced sidewall being made from at least one of Zircaloy-4, Niobium-Tin-Iron (NSF) alloy or Vanadium-Boride (VB) alloy.

5. The fuel assembly of claim 1, wherein the first uniformly constant thickness of the reinforced sidewall is 20 mils or more thicker than the second uniformly constant thickness of the non-reinforced sidewall.

6. The fuel assembly of claim 1, wherein the at least one second sidewall includes a first sidewall and a second sidewall that are the non-reinforced sidewall.

7. The fuel assembly of claim 1, wherein
the entirety of the at least one first select sidewall has the first uniformly constant thickness, and
the entirety of the at least one second sidewall has the second uniformly constant thickness.

8. The fuel assembly of claim 1, wherein
the entirety of the at least one first select sidewall is made from a first material, and
the entirety of the at least one second sidewall is made from a second material, the first material being more resistant to radiation-induced deformation than the second material.

9. A reactor core in a commercial nuclear power plant, the reactor core comprising:
a first fuel assembly and a second fuel assembly each including
at least one fuel rod, and
an outer channel with sidewalls surrounding the fuel rod, the outer channel having a configuration based on a position within the reactor core of a nuclear reactor, each of the sidewalls being either a reinforced sidewall or a non-reinforced sidewall, the reinforced sidewall being in a controlled location that faces and is directly adjacent to a control blade that is to be utilized in the nuclear reactor, the non-reinforced sidewall being in a non-controlled location that has a lower relative reactivity than the rest of the reactor core or is at an edge location within the reactor core, an entirety of the reinforced sidewall as a whole being at least one of a first uniformly constant thickness that is thicker than a second uniformly constant thickness of an entirety of the non-reinforced sidewall as a whole or uniformly made from a material that is more resistant to radiation-induced deformation as compared to an entirety of the non-reinforced sidewall,
the first fuel assembly including at least one first sidewall that is the reinforced sidewall and at least one second sidewall that is the non-reinforced sidewall,
each of the sidewalls of the second fuel assembly being the non-reinforced sidewall.

10. The reactor core of claim 9, wherein
the entirety of the at least one first sidewall has the first uniformly constant thickness, and
the entirety of the at least one second sidewall has the second uniformly constant thickness.

11. The reactor core of claim 9, wherein
the entirety of the at least one first sidewall is made from a first material, and
the entirety of the at least one second sidewall is made from a second material, the first material being more resistant to radiation-induced deformation than the second material.

* * * * *

UNITED STATES PATENT AND TRADEMARK OFFICE
CERTIFICATE OF CORRECTION

PATENT NO. : 11,887,741 B2
APPLICATION NO. : 17/577680
DATED : January 30, 2024
INVENTOR(S) : Jason B. Ingraham et al.

It is certified that error appears in the above-identified patent and that said Letters Patent is hereby corrected as shown below:

On the Title Page

In item (72), Line 1, replace "Jason B Ingraham" with -- Jason B. Ingraham --.

Signed and Sealed this
Seventh Day of May, 2024

Katherine Kelly Vidal
*Director of the United States Patent and Trademark Office*